(12) United States Patent
Suzuki et al.

(10) Patent No.: US 11,859,581 B2
(45) Date of Patent: Jan. 2, 2024

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/297,000

(22) Filed: Apr. 7, 2023

(65) Prior Publication Data

US 2023/0323843 A1 Oct. 12, 2023

(30) Foreign Application Priority Data

Apr. 12, 2022 (JP) ................................. 2022-065836

(51) Int. Cl.
*F02M 25/00* (2006.01)
*F02M 25/022* (2006.01)
*F02M 25/028* (2006.01)
*F02M 35/10* (2006.01)

(52) U.S. Cl.
CPC ...... *F02M 25/0227* (2013.01); *F02M 25/028* (2013.01); *F02M 35/1038* (2013.01)

(58) Field of Classification Search
CPC ............. F02M 25/0227; F02M 25/028; F02M 25/0225; F02M 35/1038; F02M 41/0065
See application file for complete search history.

(56) References Cited

U.S. PATENT DOCUMENTS 4,558,665 A * 12/1985 Sandberg ........... F02M 25/0225
123/25 J
9,945,310 B1 * 4/2018 McQuillen ........... F02M 35/104

FOREIGN PATENT DOCUMENTS

| CN | 104141547 A | * | 11/2014 | ......... F02D 19/0642 |
|---|---|---|---|---|
| JP | 2017-218994 A | | 12/2017 | |
| JP | 6477847 B1 | * | 3/2019 | |
| JP | 2021-14799 A | | 2/2021 | |
| JP | 2021-116791 A | | 8/2021 | |

* cited by examiner

*Primary Examiner* — Syed O Hasan
(74) *Attorney, Agent, or Firm* — HAUPTMAN HAM, LLP (57) ABSTRACT

A controller for an internal combustion engine is configured to execute a first injection process that causes a water injection valve to inject water when an intake valve is open and a second injection process that causes the water injection valve to inject water when the intake valve is closed. The controller is further configured to set a pressure of the water supplied to the water injection valve to be higher in the second injection process than in the first injection process.

4 Claims, 3 Drawing Sheets

Fig.6

CONTROLLER AND CONTROL METHOD FOR INTERNAL COMBUSTION ENGINE

RELATED APPLICATIONS

The present application claims priority of Japanese Patent Application No. 2022-065836 filed Apr. 12, 2022, the disclosure of which is hereby incorporated by reference herein in its entirety.

BACKGROUND

1. Field

The present disclosure relates to a controller and a control method for an internal combustion engine.

2. Description of Related Art

Japanese Laid-Open Patent Publication No. 2017-218994 discloses an internal combustion engine and its controller. The internal combustion engine disclosed in this publication includes cylinders, an intake passage connected to the cylinders, and water injection valves located in the intake passage. The controller disclosed in this publication causes the water injection valves to inject water when the internal combustion engine is in a high-load running state. The water injected by the water injection valves flows into the corresponding cylinders through the intake passage and evaporates in the cylinders. When the water evaporates, the heat of vaporization lowers the temperatures in the cylinders.

When water is injected from the water injection valve in a period during which an intake valve that selectively opens and closes a connection port between the intake passage and corresponding one of the cylinders is open, the water is supplied to the cylinder through the intake passage. However, depending on the amount of water requested, the water injection valve may be unable to fully inject the requested amount of water during the period in which the intake valve is open. To solve this problem, water may be injected from the water injection valve not only in the open period of the intake valve but also in the closed period of the intake valve, which is before the open period.

The water injected by the water injection valve in the closed period of the intake valve accumulates in the intake passage until the intake valve opens. During the accumulation period, the water may collect on the wall surface of the intake passage in the form of a film. The larger the amount of water that collects on the wall surface, the thicker the liquid film and the less likely the water is to evaporate. If the water forming the liquid film remains in the intake passage, there is a possibility that the necessary amount of water cannot be supplied to the cylinders.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine. The internal combustion engine includes: a cylinder; an intake passage connected to the cylinder; a water injection valve configured to inject water into the intake passage; an intake valve configured to selectively open and close a connection port between the intake passage and the cylinder; and a pressure adjustment device configured to adjust pressure of water supplied to the water injection valve. The controller includes processing circuitry configured to execute a first injection process that causes the water injection valve to inject water when the intake valve is open and a second injection process that causes the water injection valve to inject water when the intake valve is closed. The processing circuitry is further configured to control the pressure adjustment device such that the pressure of the water supplied to the water injection valve becomes higher in the second injection process than in the first injection process.

Another aspect of the present disclosure provides a control method for an internal combustion engine. The internal combustion engine includes: a cylinder; an intake passage connected to the cylinder; a water injection valve configured to inject water into the intake passage; and an intake valve configured to selectively open and close a connection port between the intake passage and the cylinder. The control method includes: executing a first injection process that causes the water injection valve to inject water when the intake valve is open; executing a second injection process that causes the water injection valve to inject water when the intake valve is closed; and setting pressure of the water supplied to the water injection valve to be higher in the second injection process than in the first injection process.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of the present disclosure will now be described with reference to the drawings.

Summary of Internal Combustion Engine

Figure 1:
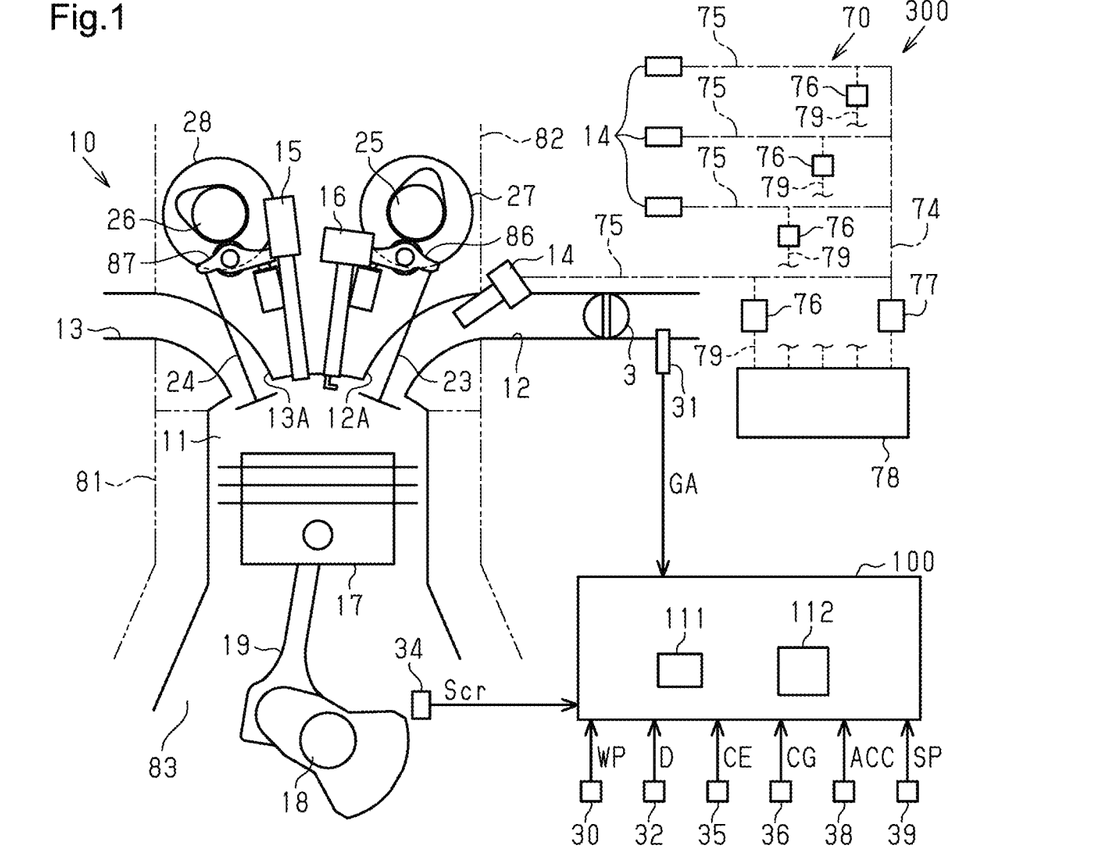
FIG. 1 is a schematic diagram showing the structure of an internal combustion engine.

As shown in FIG. 1, a vehicle 300 includes an internal combustion engine 10. The internal combustion engine 10 is a driving force of the vehicle 300.

The internal combustion engine 10 includes a cylinder block 81, cylinders 11, pistons 17, connecting rods 19, a crank chamber 83, and a crankshaft 18. FIG. 1 shows only one of the cylinders 11. The same applies to the pistons 17 and the connecting rods 19. The number of the cylinders 11 is four. Each cylinder 11 is a space defined in a cylinder block 81. In the cylinder 11, the air-fuel mixture of intake air and fuel burns. The crank chamber 83 is a space defined by the cylinder block 81 and an oil pan (not shown). The crank chamber 83 is located below the cylinders 11. The crank chamber 83 connects to the cylinders 11. The crank chamber 83 accommodates the crankshaft 18. Each piston 17 is disposed in a corresponding cylinder 11. The piston 17 is located in the cylinder 11. The piston 17 reciprocates in the cylinder 11. The piston 17 is coupled to the crankshaft 18 by the connecting rod 19. As the piston 17 operates, the crankshaft 18 rotates.

The internal combustion engine 10 includes a cylinder head 82, ignition plugs 16, and fuel injection valves 15. FIG. 1 shows only one of the ignition plugs 16. The same applies to the fuel injection valves 15. The ignition plugs 16 and the fuel injection valves 15 are attached to the cylinder head 82. Each ignition plug 16 is disposed in a corresponding cylinder 11. The ignition plug 16 ignites the air-fuel mixture in the cylinder 11. Each fuel injection valve 15 is disposed in a corresponding cylinder 11. The fuel injection valve 15 directly injects fuel into the cylinder 11 without using an intake passage 12, which will be described below.

The internal combustion engine 10 includes the intake passage 12 and a throttle valve 3. The intake passage 12 is a passage into which intake air is drawn into each cylinder 11. The intake passage 12 is connected to the cylinders 11. Specifically, the downstream portion of the intake passage 12 has intake ports 12A defined in the cylinder head 82. The intake passage 12 branches into intake ports 12 at a certain position. FIG. 1 shows only one of the intake ports 12A. Each intake port 12A is disposed in a corresponding cylinder 11. The intake port 12A is connected to the cylinder 11. The throttle valve 3 is located upstream of the intake ports 12A in the intake passage 12. The throttle valve 3 regulates an amount GA of the intake air flowing through the intake passage 12.

The internal combustion engine 10 includes water injection valves 14. Each water injection valve 14 is disposed in a corresponding cylinder 11. The water injection valves 14 are attached to the cylinder head 82. The tip of each water injection valve 14 is located in a corresponding intake port 12A. The water injection valve 14 injects water into the intake port 12A. The water injected by the water injection valve 14 flows through the intake port 12A into the cylinder 11.

The internal combustion engine 10 includes an exhaust passage 13. The exhaust passage 13 is a passage out of which exhaust gas is discharged from the cylinders 11. The exhaust passage 13 is connected to the cylinders 11. The upstream portion of the exhaust passage 13 has exhaust ports 13A defined in the cylinder head 82. FIG. 1 shows only one of the exhaust ports 13A.

The internal combustion engine 10 includes a valvetrain for intake air. The valvetrain for intake air includes intake valves 23, an intake rocker arm 86, an intake camshaft 25, and an intake valve timing varying device 27. The valvetrain for intake air is attached to the cylinder head 82. FIG. 1 shows only one of the intake valves 23. The same applies to the intake rocker arms 86. Each intake valve 23 is disposed in a corresponding intake port 12A. The intake valve 23 is located at a connection port between the intake port 12A and the cylinder 11. The intake valve 23 is coupled to the intake camshaft 25 by the intake rocker arm 86. As the intake camshaft 25 rotates, the intake valve 23 operates to selectively open and close the connection port between the intake port 12A and the cylinder 11. Rotation of the crankshaft 18 is transmitted to the intake camshaft 25. That is, the intake camshaft 25 rotates in conjunction with the crankshaft 18. The intake valve timing varying device 27 changes the rotation position of the crankshaft 18 relative to the rotation position of the intake camshaft 25 (hereinafter referred to as the crank position Scr). This changes the timing of selectively opening and closing the intake valve 23 relative to the crank position Scr. The intake valve timing varying device 27 is, for example, an electric device that is driven by an electric motor.

The internal combustion engine 10 includes a valvetrain for exhaust gas. The valvetrain for exhaust gas includes exhaust valves 24, an exhaust rocker arm 87, an exhaust camshaft 26, and an exhaust valve timing varying device 28. The valvetrain for exhaust gas is attached to the cylinder head 82. FIG. 1 shows only one of the exhaust valve 24. The same applies to the exhaust rocker arms 87. Each exhaust valve 24 is disposed in a corresponding exhaust port 13A. The exhaust valve 24 is located at a connection port between the exhaust port 13A and the cylinder 11. The exhaust valve 24 is coupled to the exhaust camshaft 26 by the exhaust rocker arm 87. As the exhaust camshaft 26 rotates, the exhaust valve 24 operates to selectively open and close the connection port between the exhaust port 13A and the cylinder 11. Rotation of the crankshaft 18 is transmitted to the exhaust camshaft 26. That is, the exhaust camshaft 26 rotates in conjunction with the crankshaft 18. The exhaust valve timing varying device 28 changes the rotation position of the exhaust camshaft 26 relative to the crank position Scr. This changes the timing of selectively opening and closing the exhaust valve 24 relative to the crank position Scr. The exhaust valve timing varying device 28 is, for example, an electric device that is driven by an electric motor.

The internal combustion engine 10 includes a water supply mechanism 70. The water supply mechanism 70 includes a tank 78, a supply passage 74, a pump 77, branch passages 75, return passages 79, and adjustment valves 76. The tank 78 stores water. The supply passage 74 extends from the tank 78. Each branch passage 75 is disposed in a corresponding water injection valve 14. The branch passages 75 branch from the supply passage 74. Each branch passage 75 is connected to a corresponding water injection valve 14. The pump 77 is located in the supply passage 74. The pump 77 is an electric pump that is driven by an electric motor. The pump 77 forcibly delivers water from the tank 78 to the branch passages 75 through the supply passage 74. Each return passage 79 is disposed in a corresponding branch passage 75. The return passage 79 connects the branch passage 75 to the tank 78. The return passage 79 is a passage through which water returns from the branch passage 75 into the tank 78. In FIG. 1, the return passages 79 are shown by the dotted lines. Each adjustment valve 76 is disposed in a corresponding return passage 79. The adjustment valve 76 is located in the return passage 79. The adjustment valve 76 is an electric valve that is driven by an electric motor. The adjustment valve 76 is of a butterfly type. That is, an open degree D of the adjustment valve 76 is adjustable. Depending on the open degree D of the adjustment valve 76, the flow passage area of the return passage 79 changes. Further, a change occurs in the amount of water that returns to the tank 78 through the return passage 79. Furthermore, a change occurs in the pressure in a portion of the branch passage 75 downstream of the part connected to the return passage 79 (i.e., the pressure of water supplied to the water injection valve 14). That is, the adjustment valve 76 is a pressure adjustment device that adjusts the pressure of water supplied to the water injection valve 14. Depending on the open degree D of each adjustment valve 76, the pressure of the water supplied to a corresponding water injection valve 14 changes. The open degrees D of the adjustment valves 76 can be adjusted individually.

The internal combustion engine 10 includes a crank position sensor 34, an intake cam position sensor 36, an exhaust cam position sensor 35, and an air flow meter 31. The crank position sensor 34 detects the crank position Scr. The intake cam position sensor 36 detects a rotation position CG of the intake camshaft 25. The exhaust cam position sensor 35 detects a rotation position CE of the exhaust camshaft 26. The air flow meter 31 is located upstream of the throttle valve 3 in the intake passage 12. The air flow meter 31 detects the amount GA of the intake air flowing through the portion of the intake passage 12 where the air flow meter 31 is disposed. These sensors each repeatedly send a signal corresponding to the detected information to a controller 100 (described later).

The internal combustion engine 10 includes water pressure sensors 30 and open degree sensors 32. FIG. 1 shows only one of the water pressure sensors 30. The same applies to the open degree sensors 32. Each water pressure sensor 30 is disposed in a corresponding branch passage 75. Each water pressure sensor 30 detects a pressure WP of the water supplied to a corresponding water injection valve 14 (hereinafter referred to as water pressure WP). Each open degree sensor 32 is disposed in a corresponding adjustment valve 76. Each open degree sensor 32 detects the open degree D of a corresponding adjustment valve 76. These sensors each repeatedly send a signal corresponding to the detected information to the controller 100 (described later).

The vehicle 300 includes an accelerator sensor 38 and a vehicle speed sensor 39. The accelerator sensor 38 detects an accelerator operation amount ACC, which is the depression amount of the accelerator pedal of the vehicle 300. The vehicle speed sensor 39 detects a vehicle speed SP, which is the travel speed of the vehicle 300. These sensors each repeatedly send a signal corresponding to the detected information to the controller 100 (described later).

Schematic Configuration of Controller

As shown in FIG. 1, the vehicle 300 includes the controller 100. The controller 100 may include processing circuitry including one or more processors that execute various processes in accordance with a computer program (software). The controller 100 may include processing circuitry that includes one or more dedicated hardware circuits such as application specific integrated circuits (ASICs) that execute at least part of various processes or may include processing circuitry that includes a combination of the processors and the dedicated hardware circuits. The processor includes a CPU 111 and a memory 112, such as a RAM or a ROM. The memory 112 stores program codes or instructions configured to cause the CPU 111 to execute the processes. The memory 112, or a computer-readable medium, includes any type of media that are accessible by general-purpose computers and dedicated computers. The memory 112 is, an electrically-rewriteable non-volatile memory.

The controller 100 repeatedly receives detection signals from the various sensors of the vehicle 300. Based on the received detection signals, the controller 100 calculates the following parameters when necessary. Based on the crank position Scr detected by the crank position sensor 34, the controller 100 calculates an engine rotation speed NE, which is the rotation speed of the crankshaft 18. Based on the engine rotation speed NE and the amount GA of the intake air detected by the air flow meter 31, the controller 100 calculates the engine load factor KL. The engine load factor KL is the ratio of the current cylinder inflow air amount to a cylinder inflow air amount obtained during steady operation of the internal combustion engine 10 with the throttle valve 3 fully open at the current engine rotation speed NE. The cylinder inflow air amount refers to the amount of the intake air flowing into one cylinder 11 in the intake stroke.

The controller 100 controls the internal combustion engine 10. Based on the accelerator operation amount ACC, the vehicle speed SP, the engine rotation speed NE, the engine load factor KL, and the like, the controller 100 performs various types of control on the internal combustion engine 10 (e.g., fuel injection by the fuel injection valves 15, the ignition timings of the ignition plugs 16, the adjustment of the open degree of the throttle valve 3). By performing such control, the controller 100 causes air-fuel mixture to sequentially burn in the cylinders 11.

As part of the various control of the internal combustion engine 10, the controller 100 controls the timing of the opening and closing of the intake valves 23 (hereinafter referred to as the intake valve timing) and the timing of the opening and closing of the exhaust valves 24. For example, the controller 100 executes the following control related to the control of the intake valve timing. In the present embodiment, the controller 100 treats, as 0 (initial value), a state in which the intake valve timing is most retarded. By adjusting the advancement amount of the intake valve timing from the initial value, the controller 100 adjusts the intake valve timing. To adjust the intake valve timing, the controller 100 calculates a target advancement amount, which is a target value of the advancement amount of the intake valve timing, based on the engine rotation speed NE, the engine load factor KL, and the like. Then, the controller 100 controls the intake valve timing varying device 27 such that the advancement amount of an actual intake valve timing coincides with the target advancement amount. The controller 100 stores, in advance, the crank position Scr at which the intake valve 23 of each cylinder 11 reaches a valve-opening time TS when the intake valve timing has the initial value. Thus, by calculating a crank position Scr that is advanced from the valve-opening crank position Scr by the target advancement amount, the controller 100 obtains the current crank position Scr at which the intake valve 23 reaches the valve-opening time TS. Likewise, the controller 100 stores, in advance, the crank position Scr at which the intake valve 23 of each cylinder 11 reaches a valve-closing time TC when the intake valve timing has the initial value. This allows the controller 100 to obtain the current crank position Scr at which the intake valve 23 reaches the valve-closing time TC. In such a manner, the controller 100 uses the crank position Scr corresponding to the initial value and the target advancement amount to constantly obtain the crank position Scr at which the intake valve 23 of each cylinder 11 reaches the valve-closing time TS and the crank position Scr at which the intake valve 23 reaches the valve-closing time TC.

Summary of Water Injection Control

Figure 2:
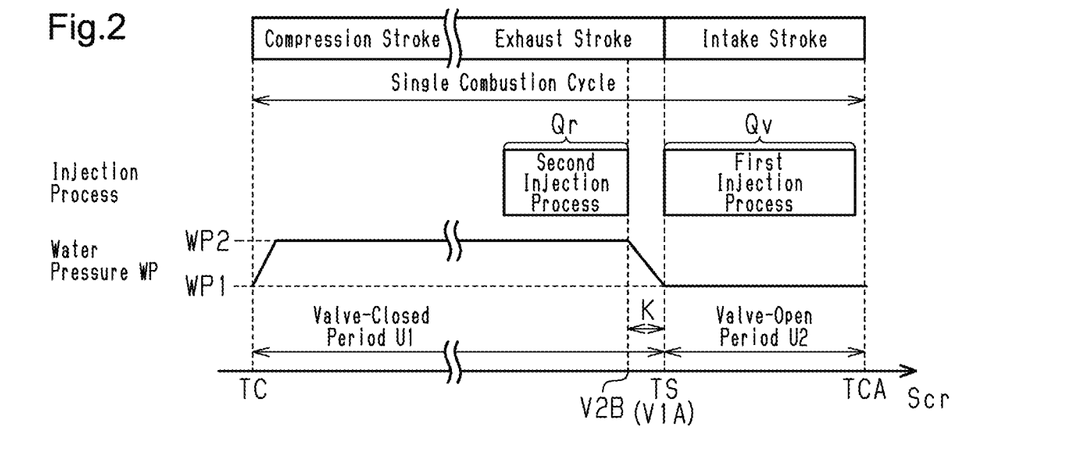
FIG. 2 is a timing diagram illustrating the relationship between the injection process and the water pressure in the water injection control.

The controller 100 is capable of executing water injection control. The water injection control is executed to control the ignition timing, injection amount, and injection pressure of the water from each water injection valve 14. In the present embodiment, a single combustion cycle is defined as a period from when the intake valve 23 of a specific cylinder 11 closes to when the intake valve 23 closes again after opening. That is, as shown in FIG. 2, the single combustion cycle is a period from the valve-closing time TC, at which the intake valve 23 closes, to a valve-closing time TCA, at which the intake valve 23 closes again after the elapse of the valve-opening time TS, at which the intake valve 23 opens. In the single combustion cycle, the specific cylinder 11 enters each of the compression stroke, the expansion stroke, the exhaust stroke, and the intake stroke. The period during which the intake valve 23 is closed (i.e., the period from the valve-closing time TC to the valve-opening time TS of the intake valve 23) is hereinafter referred to as a valve-closed period U1 of the intake valve 23. The period during which the intake valve 23 is open (i.e., the period from the valve-opening time TS to the valve-closing time TCA of the intake valve 23) is hereinafter referred to as a valve-open period U2 of the intake valve 23.

As part of the water injection control, the controller 100 can execute a target calculation process. In the target calculation process, the running state of the internal combustion engine 10 is used to calculate a target injection amount Qs. The target injection amount Qs is a target value of the amount of water supplied to one cylinder 11 during the single combustion cycle. The controller 100 stores, in advance, a target water amount map M1 as the information used to calculate the target injection amount Qs. The target water amount map M1 represents the relationship between the engine rotation speed NE, the engine load factor KL, and a requested water amount. The requested water amount is the amount of water that needs to be supplied to one cylinder 11 in the single combustion cycle. In the target water amount map M1, the engine rotation speed NE, the engine load factor KL, and the requested water amount have the following relationship. When the engine load factor KL is less than a set load factor (described below), the requested water amount is 0 regardless of whether the engine rotation speed NE is relatively high or low. When the engine load factor KL is greater than or equal to the set load factor, the requested water amount is greater than 0 regardless of whether the engine rotation speed NE is relatively high or low. Specifically, when the engine load factor KL is greater than or equal to the set load factor, the requested water amount becomes larger as the engine load factor KL becomes higher at a certain engine rotation speed NE. The water injected by the water injection valve 14 evaporates in the cylinder 11. When the water evaporates, the heat of vaporization lowers the temperature in the cylinder 11. The requested water amount that is set for the target water amount map M1 has a value allowing for cooling in the cylinder 11 that is requested depending on each engine running state. Further, the set load factor is the lowest value of the engine load factor KL at which the temperature in the cylinder 11 needs to be lowered through the supply of water from the water injection valve 14. The target water amount map M1 is created based on, for example, experiments or simulations.

As part of the water injection control, the controller 100 can execute a determination process. The determination process is a process that determines whether the target injection amount Qs of water can be supplied from the water injection valve 14 to the cylinder 11 during the valve-open period U2 of the intake valve 23 in the single combustion cycle. The maximum value of the amount that can be supplied to each cylinder 11 by injecting water from a corresponding water injection valve 14 during the valve-open period U2 of the intake valve 23 in the single combustion cycle is hereinafter referred to as an allowable injection amount Qv. The allowable injection amount Qv is determined based on a prior condition in which the water pressure WP has a value used for a first injection process (described later). In the determination process, the controller 100 determines whether the allowable injection amount Qv is greater than or equal to the target injection amount Qs. The controller 100 stores, in advance, a reach period L as the information needed to calculate the allowable injection amount Qv. The reach period L is the length of time from when the water injection valve 14 injects water to when the water reaches the inside of the cylinder 11. The reach period L is defined based on, for example, experiments or simulations. In the present embodiment, the reach period L has a fixed value. The controller 100 further stores, in advance, an injection map M2 as the information needed to calculate the allowable injection amount Qv. The amount of water injected by one water injection valve 14 over a certain injection period under a certain water pressure WP is hereinafter referred to as a possible injection amount. The possible injection amount changes depending on the injection period. As described above, the injection period is a period during which the water injection valve 14 continues to inject water. The injection map M2 represents the relationship between the injection period, the water pressure WP, and the possible injection amount. In the injection map M2, the injection period, the water pressure WP, and the possible injection amount have the following relationship. At a certain water pressure WP, the possible injection amount becomes larger as the injection period becomes longer. In a certain injection period, the possible injection amount becomes larger as the water pressure WP becomes higher. The injection map M2 is created based on, for example, experiments or simulations.

As part of the water injection control, the controller 100 can execute the first injection process and a second injection process. The first injection process is a process that causes the water injection valve 14 to inject water during the valve-open period U2 of the intake valve 23 in the single combustion cycle. The second injection process is a process that causes the water injection valve 14 to inject water during the valve-closed period U1 of the intake valve 23 in the single combustion cycle. When the determination result of the determination process is affirmative, the controller 100 executes only the first injection process. In this case, the controller 100 causes the water injection valve 14 to inject the target injection amount Qs of water through the first injection process. When the determination result of the determination process is negative, the controller 100 executes the first and second injection processes as shown in FIG. 2. In this case, the controller 100 causes the water injection valve 14 to inject the allowable injection amount Qv of water through the first injection process and causes the water injection valve 14 to inject the set injection amount Qr of water through the second injection process. The set injection amount Qr is the amount of the difference between the allowable injection amount Qv and the target injection amount Qs. In this manner, when the determination result of the determination process is negative, the controller 100 executes the two injection processes so that the water injection valve 14 injects the target injection amount Qs of water.

As shown in FIG. 2, the controller 100 sets a different water pressure WP for each of the first and second injection processes. Specifically, the controller 100 controls the adjustment valve 76 such that the water pressure WP becomes a first value WP1 during the execution of the first injection process. The controller 100 controls the adjustment valve 76 such that the water pressure WP becomes a second value WP2 during the execution of the second injection process. The second value WP2 is higher than the first value WP1. That is, the controller 100 controls the adjustment valve 76 such that the water pressure WP becomes higher in the second injection process than in the first injection process. This means that the controller 100 sets the injection pressure of water from the water injection valve 14 to be higher in the second injection process than in the first injection process. The first value WP1 is predetermined through, for example, experiments or simulations. The second value WP2 is predetermined through, for example, experiments or simulations. The controller 100 stores the first value WP1 and the second value WP2 in advance. The reason for changing the water pressure WP between the first and second injection processes will be described in the Operation section. The details of the first value WP1 and the second value WP2 will also be described. In the present embodiment, the controller 100 sets the water pressure WP to the first value WP1 over the entire period during which the first injection process is executed. The controller 100 sets the water pressure WP to the second value WP2 over the entire period during which the second injection process is executed.

To control the water pressure WP depending on each injection process, the controller 100 substantially changes the open degree D of each adjustment valve 76. The state in which the amount of water discharged by the pump 77 is a constant set discharge amount is referred to as a first state. The open degree D of the adjustment valve 76 needed to set the water pressure WP to the first value WP1 in the first state is referred to as a first open degree D1. The open degree D of the adjustment valve 76 needed to set the water pressure WP to the second value WP2 in the first state is referred to as a second open degree D2. The rotation speed of the pump 77 needed to set the discharge amount of the pump 77 to the set discharge amount is referred to as a set rotation speed. The controller 100 stores the first open degree D1, the second open degree D2, and the set rotation speed in advance. The first open degree D1, the second open degree D2, and the set rotation speed are defined based on, for example, experiments or simulations, with the flow passage area of the adjustment valve 76 corresponding to the adjustment valve 76 and the discharging performance of the pump 77 taken into account. To change the open degree D of the adjustment valve 76 to the first open degree D1 or the second open degree D2, the controller 100 refers to a detection value of the open degree sensor 32 as necessary and controls the electric motor of the adjustment valve 76 such that the requested open degree D is obtained.

As part of the water injection control, the controller 100 can execute a first injection time calculation process. The first injection time calculation process is a process that calculates a start time of the first injection process (hereinafter referred to as the first start time V1A) and an end time of the first injection process (hereinafter referred to as the first end time V1B). As shown in FIG. 2, the controller 100 sets the valve-opening time TS of the intake valve 23 to the first start time V1A in the first injection time calculation process. Further, the controller 100 sets the first end time V1B to be before a limit time in the first injection time calculation process. The limit time is before the valve-closing time TCA of the intake valve 23 by the reach period L. The valve-closing time TCA of the intake valve 23 is the end time of the single combustion cycle.

As part of the water injection control, the controller 100 can execute a second injection time calculation process. The second injection time calculation process is a process that calculates a start time of the second injection process (hereinafter referred to as the second start time V2A) and an end time of the second injection process (hereinafter referred to as the second end time V2B). In the second injection time calculation process, the controller 100 determines the second start time V2A such that the second injection process ends before the first start time V1A by a specified period K. To make such a determination, the controller 100 sets the second start time V2A and the second end time V2B as follows. The controller 100 sets the second end time V2B to be before the first start time V1A by the specified period K. Further, the controller 100 sets the second start time V2A to be before the second end time V2B by a period needed for the injection of the set injection amount Qr of water from the water injection valve 14. The minimum period for changing the water pressure WP from the second value WP2 to the first value WP1 is referred to as the necessary period. The necessary period is a period for changing the open degree D of the adjustment valve 76 from the second open degree D2 to the first open degree D1. In the present embodiment, the controller 100 sets the specified period K to the necessary period. The controller 100 stores the necessary period in advance. The necessary period is defined in advance through, for example, experiments or simulations. The changes in the water pressure WP shown in FIG. 2 and the flow of the injection processes will be described in detail below in the Operation section.

Detailed Processing Content of Water Injection Control

The series of processes related to the water injection control described below are executed for one cylinder 11. That is, the controller 100 executes the following series of processes related to the water injection control for each cylinder 11 (i.e., each water injection valve 14). When the internal combustion engine 10 is running (i.e., when the engine rotation speed NE is greater than 0), the controller 100 repeatedly executes the water injection control. For each cylinder 11, the controller 100 executes the series of processes related to the water injection control once in the single combustion cycle. In each combustion cycle, the controller 100 starts the water injection control at the start time of the single combustion cycle (i.e., the valve-closing time TC of the intake valve 23). Based on the newest crank position Scr received from the crank position sensor 34, the controller 100 determines the time of starting the water injection control. That is, when the newest crank position Scr coincides with the crank position Scr at which the intake valve 23 reaches the valve-closing time TC, the controller 100 determines that the intake valve 23 has reached the valve-closing time TC. Although the details will not be described, the valve-closing time TC and the valve-opening time TS of the intake valve 23 referred to and used by the controller 100 in the series of processes of the water injection control are related to the cylinder 11 for which the water injection control is executed. While the internal combustion engine 10 is running, the controller 100 controls the pump 77 such that the rotation speed of the pump 77 coincides with the set rotation speed. At the point in time when the internal combustion engine 10 is started, the controller 100 controls the adjustment valve 76 such that the open degree D of the adjustment valve 76 coincides with the first open degree D1. Thus, when the water injection control is executed for the first time after the internal combustion engine 10 is started, the open degree D of the adjustment valve 76 at the point in time when the water injection control is started is the first open degree D1.

Figure 3:
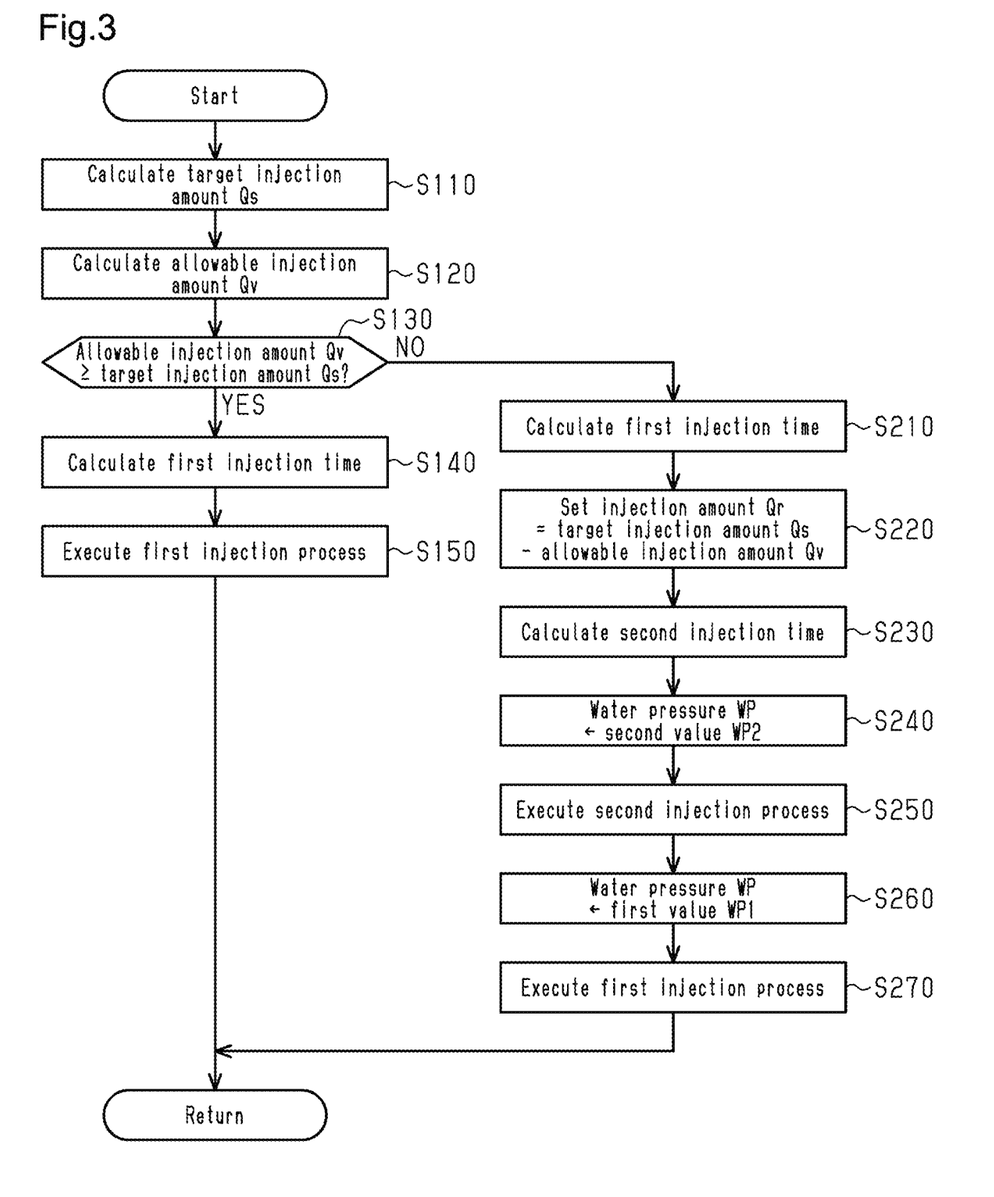
FIG. 3 is a flowchart illustrating a procedure of the water injection control.

As shown in FIG. 3, when starting the water injection control, the controller 100 first executes the process of step S110. In step S110, the controller 100 calculates the target injection amount Qs. Specifically, the controller 100 refers to the newest engine rotation speed NE, the newest engine load factor KL, and the target water amount map M1. As described above, the target water amount map M1 represents the relationship between the engine rotation speed NE, the engine load factor KL, and the requested water amount, which is the amount of water that needs to be supplied to the cylinder 11. Based on the target water amount map M1, the controller 100 calculates, as the target injection amount Qs, the requested water amount corresponding to the newest engine rotation speed NE and the newest engine load factor KL. Subsequently, the controller 100 advances the process to step S120. The process of step S110 is the target calculation process.

In step S120, the controller 100 calculates the allowable injection amount Qv. As described below, the allowable injection amount Qv is the amount of water that can be injected by the water injection valve 14 during a period in the valve-open period U2 of the intake valve 23 excluding the reach period L. As described above, the reach period L is the length of time to when the water injected by the water injection valve 14 reaches the inside of the cylinder 11. To calculate the allowable injection amount Qv, the controller 100 first uses the newest engine rotation speed NE to convert the reach period L into a crank rotation amount corresponding to the newest engine rotation speed NE. Then, the controller 100 sets the obtained crank rotation amount as an offset value. The crank rotation amount represents the rotation angle of the crankshaft 18 obtained when the crankshaft 18 rotates from a rotation position to another rotation position. The higher the engine rotation speed NE, the larger the offset value. After calculating the offset value, the controller 100 calculates a limit crank position. Specifically, the controller 100 calculates the crank position Scr before, by the offset value, the crank position Scr at which the intake valve 23 reaches the valve-closing time TCA as the limit crank position. As shown in FIG. 2, the valve-closing time TCA is the end time of the current combustion cycle. After calculating the limit crank position, the controller 100 calculates an allowable rotation amount. The allowable rotation amount is a crank rotation amount obtained from the crank position Scr at which the intake valve 23 reaches the valve-opening time TS to the limit crank position. After calculating the allowable rotation amount, the controller 100 uses the newest engine rotation speed NE to convert the allowable rotation amount into the length of a time that corresponds to the newest engine rotation speed NE. Then, the controller 100 sets the obtained value as an allowable period. At the same allowable rotation amount, the higher the engine rotation speed NE, the shorter the allowable period. Subsequently, the controller 100 refers to the injection map M2 and the first value WP1, which is the water pressure WP used for the first injection process. As described above, the injection map M2 represents the relationship between the injection period, the water pressure WP, and the possible injection amount. The controller 100 uses the injection map M2 to calculate, as the allowable injection amount Qv, the possible injection amount corresponding to the first value WP1 and the allowable period. In this case, the controller 100 only needs to apply the allowable period to the injection period in the injection map M2. As shown in FIG. 3, after calculating the allowable injection amount Qv, the controller 100 advances the process to step S130.

In step S130, the controller 100 determines whether the allowable injection amount Qv calculated in step S120 is greater than or equal to the target injection amount Qs calculated in step S110. When this determination is affirmative, the target injection amount Qs of water can be supplied to the cylinder 11 from the water injection valve 14 during the valve-open period U2 of the intake valve 23 in the single combustion cycle. When the allowable injection amount Qv is greater than or equal to the target injection amount Qs (step S130: YES), the controller 100 advances the process to step S140. The process of step S130 is the determination process.

In step S140, the controller 100 calculates the first injection time. Specifically, the controller 100 calculates the first start time V1A, which is the start time of the first injection process, and the first end time V1B, which is the end time of the first injection process. First, the controller 100 calculates the first start time V1A. Specifically, the controller 100 sets the crank position Scr of the first start time V1A to the crank position Scr at which the intake valve 23 reaches the valve-opening time TS. Next, the controller 100 calculates the first end time V1B. Specifically, the controller 100 refers to the first value WP1, which is the water pressure WP for the first injection process, the target injection amount Qs calculated in step S110, and the injection map M2. The controller 100 uses the injection map M2 to calculate, as a normal injection period, the injection period corresponding to the first value WP1 and the target injection amount Qs. Subsequently, the controller 100 uses the newest engine rotation speed NE to convert the normal injection period into a crank rotation amount corresponding to the newest engine rotation speed NE. The controller 100 sets the obtained value as a normal rotation amount. Then, the controller 100 calculates, as the crank position Scr of the first end time V1B, the crank position Scr retarded from the crank position Scr of the first start time V1A by the normal rotation amount. After calculating the first end time V1B, the controller 100 advances the process to step S150. The process of step S140 is the first injection time calculation process. After starting the water injection control, the controller 100 immediately executes the processes of step S110 to S140. Thus, the time at which the process is advanced to the next step S150 is substantially equal to the time at which the single combustion cycle starts.

In step S150, the controller 100 executes the first injection process. Specifically, the controller 100 waits until the first start time V1A calculated in step S140. When the first start time V1A is reached, the controller 100 causes the water injection valve 14 to start injecting water. Then, the controller 100 continues the water injection until the first end time V1B calculated in step S140. When the first end time V1B is reached, the controller 100 causes the water injection valve 14 to stop injecting water. During the execution of the first injection process, the water pressure WP has the first value WP1 in relation to the process of step S260 in which the previous water injection control was executed. To start the first injection process in step S150, the controller 100 determines in the following manner that the first start time V1A is reached. The controller 100 repeatedly refers to the newest crank position Scr received from the crank position sensor 34. Then, when determining that the newest crank position Scr coincides with the crank position Scr of the first start time V1A, the controller 100 determines that the first start time V1A is reached. In the same manner, when determining that the newest crank position Scr coincides with the crank position Scr of the first end time V1B, the controller 100 determines that the first end time V1B is reached. After executing the first injection process, the controller 100 temporarily ends the series of processes related to the water injection control. When the start time of the single combustion cycle is reached, the controller 100 executes the process of step S110 again.

When determining that the allowable injection amount Qv is less than the target injection amount Qs (step S130: NO), the controller 100 advances the process to step S210.

In step S210, the controller 100 calculates the first injection time. That is, the controller 100 calculates the first start time V1A and the first end time V1B in the same manner as step S140. In step S210, the controller 100 sets the crank position Scr of the first start time V1A to the crank position Scr at which the valve-opening time TS of the intake valve 23 is reached. The controller 100 sets the first end time V1B as follows. The controller 100 sets the crank position Scr of the first end time V1B to the limit crank position calculated in correspondence with the calculation of the allowable injection amount Qv in step S120. Subsequently, the controller 100 advances the process to step S220. The process of step S210 is the first injection time calculation process.

In step S220, the controller 100 calculates the set injection amount Qr, which is the difference between the target injection amount Qs and the allowable injection amount Qv. Specifically, the controller 100 sets the set injection amount Qr to a value obtained by subtracting the allowable injection amount Qv from the target injection amount Qs. Then, the controller 100 advances the process to step S230.

In step S230, the controller 100 calculates the second injection time. Specifically, the controller 100 calculates the second start time V2A, which is the start time of the second injection process, and the second end time V2B, which is the end time of the second injection process. The controller 100 first calculates the second end time V2B. Specifically, the controller 100 refers to the necessary period stored in advance and the newest engine rotation speed NE. Then, the controller 100 uses the newest engine rotation speed NE to convert the necessary period into a crank rotation amount corresponding to the newest engine rotation speed NE. The controller 100 sets the obtained crank rotation amount as a necessary rotation amount. The higher the engine rotation speed NE, the larger the necessary rotation amount. Subsequently, the controller 100 calculates the crank position Scr before, by the necessary rotation amount, the crank position Scr of the first start time V1A calculated in step S210 as the crank position Scr of the second end time V2B. Next, the controller 100 calculates the second start time V2A. Specifically, the controller 100 refers to the second value WP2, which is the water pressure WP for the second injection process, the set injection amount Qr calculated in step S220, and the injection map M2. The controller 100 uses the injection map M2 to calculate, as a set injection period, the injection period corresponding to the second value WP2 and the set injection amount Qr calculated in step S220. Subsequently, the controller 100 uses the newest engine rotation speed NE to convert the set injection period into a crank rotation amount corresponding to the newest engine rotation speed NE. Then, the controller 100 sets the obtained crank rotation amount as the set rotation amount. In the same manner as the necessary rotation amount, the higher the engine rotation speed NE, the larger the set rotation amount during the same set injection period. Then, the controller 100 calculates the crank position Scr before, by the set rotation amount, the crank position Scr of the calculated second end time V2B as the crank position Scr of the second start time V2A. After calculating the second start time V2A, the controller 100 advances the process to step S240. The process of step S230 is the second injection time calculation process. In the same manner as step S140, after starting the water injection control, the controller 100 immediately executes the processes of step S110 to S230. Thus, the time at which the process is advanced to the next step S240 is substantially equal to the time at which the single combustion cycle starts.

In step S240, the controller 100 changes the water pressure WP to the second value WP2. The water pressure WP at the point in time when the process is advanced to S240 has the first value WP1 in relation to the process of step S260 in which the previous water injection control was executed. The open degree D of the adjustment valve 76 is the first open degree D1. Specifically, in the process of step S240, the controller 100 controls the adjustment valve 76 such that the open degree D of the adjustment valve 76 coincides with the second open degree D2. The open degree D of the adjustment valve 76 is accordingly changed from the first open degree D1 to the second open degree D2. After executing the process of step S240, the controller 100 advances the process to step S250.

In step S250, the controller 100 executes the second injection process. Specifically, the controller 100 waits until the second start time V2A calculated in step S230. When the second start time V2A is reached, the controller 100 causes the water injection valve 14 to start injecting water. Then, the controller 100 continues the water injection until the second end time V2B calculated in step S230. When the second end time V2B is reached, the controller 100 causes the water injection valve 14 to stop injecting water. The determination of the second start time V2A and the second end time V2B is made in the same manner as step S150. After calculating the second injection process, the controller 100 advances the process to step S260.

In step S260, the controller 100 changes the water pressure WP from the second value WP2 to the first value WP1. Specifically, the controller 100 controls the adjustment valve 76 such that the open degree D of the adjustment valve 76 coincides with the first open degree D1. The open degree D of the adjustment valve 76 is accordingly changed from the second open degree D2 to the first open degree D1. The change in the open degree requires the necessary period (i.e., the specified period K of the present embodiment). After executing the process of step S260, the controller 100 advances the process to step S270. In the setting of the second end time V2B, the crank position Scr at the point in time when the process is advanced to the next step S270 is the crank position Scr of the first start time V1A.

In step S270, the controller 100 executes the first injection process. Specifically, when the process is advanced to step S270, the controller 100 immediately causes the water injection valve 14 to start injecting water. Then, the controller 100 continues the water injection until the first end time V1B calculated in step S210. When the first end time V1B is reached, the controller 100 causes the water injection valve 14 to stop injecting water. The determination of the first start time V1A and the first end time V1B is made in the same manner as step S150. After executing the first injection process, the controller 100 temporarily ends the series of processes related to the water injection control. When the start time of the single combustion cycle is reached, the controller 100 executes the process of step S110 again.

Operation of Embodiment (A) Flow of Water Injection from Water Injection Valve with Water Injection Control and Change in Water Pressure At the point in time when the single combustion cycle starts (i.e., at the valve-closing time TC of the intake valve 23), the open degree D of the adjustment valve 76 is the first open degree D1. As shown in FIG. 2, the water pressure WP thus has the first value WP1 at the valve-closing time TC of the intake valve 23. If, for example, the target injection amount Qs is relatively large or the engine rotation speed NE is relatively high, the allowable injection amount Qv may be less than the target injection amount Qs (step S130: NO). In this case, as shown in FIG. 2, at the valve-closing time TC of the intake valve 23, the controller 100 quickly changes the open degree D of the adjustment valve 76 from the first open degree D1 to the second open degree D2 (step S240). This causes the water pressure WP to change from the first value WP1 to the second value WP2. Then, as shown in FIG. 2, the controller 100 executes the second injection process in the valve-closed period U1 of the intake valve 23 with the water pressure WP kept at the second value WP2 (step S250). Then, the controller 100 causes the water injection valve 14 to inject the set injection amount Qr of water. The controller 100 ends the second injection process at the second end time V2B, which is before the valve-opening time TS of the intake valve 23 by the specified period K. Subsequently, the controller 100 changes the open degree D of the adjustment valve 76 from the second open degree D2 to the first open degree D1 (step S260). This causes the water pressure WP to change from the second value WP2 to the first value WP1 as shown in FIG. 2. The change in the water pressure WP requires the necessary period, which is set as the specified period K. Accordingly, at the point in time when the water pressure WP has been changed, the valve-opening time TS of the intake valve 23 is reached. As shown in FIG. 2, the controller 100 executes the first injection process (step S270). The controller 100 causes the water injection valve 14 to inject the allowable injection amount Qv of water during the valve-open period U2 of the intake valve 23. By executing the first and second injection processes in this manner, the controller 100 causes the water injection valve 14 to inject the target injection amount Qs of water as a total amount in the single combustion cycle.

FIG. 2 shows the necessary period, which is needed to change the water pressure WP from the second value WP2 to the first value WP1, in an exaggerated manner to facilitate the understanding of the situation in which the water pressure WP is changed between the second injection process and the first injection process. The same applies to the period during which the water pressure WP is changed from the first value WP1 to the second value WP2. The injection period of the first injection process and the injection period of the second injection process are just exemplary and do not always coincide with actual injection periods.

(B) Reason for Changing Water Pressure Between First Injection Process and Second Injection Process When water is injected from the water injection valve 14, the injected water may collect at one position on the wall surface of the intake port 12A in a concentrated manner. In this case, the collected water forms a relatively large water droplet at that position of the wall surface of the intake port 12A. Since the thickness of the liquid film formed by the water droplet is relatively large, it is difficult for the water droplet to evaporate. The water droplet remains on the wall surface of the intake port 12A or flows into the cylinder 11 together with intake air. If the water droplet flows into the cylinder 11, the water droplet runs down the wall surface of the cylinder 11 and eventually flows into the crank chamber 83. Thus, the water droplet does not cool the inside of the cylinder 11. In addition to the situation in which a relatively large water droplet formed in the intake port 12A flows into the cylinder 11, a relatively large water droplet may directly form on the wall surface of the cylinder 11. For example, when water collects at one position on the wall surface of the cylinder 11, the collected water forms a relatively large water droplet at that position on the wall surface of the cylinder 11. Such a water droplet flows into the crank chamber 83 without evaporating in the cylinder 11. Even if water evaporates, the heat of the vaporization cools the wall surface of the cylinder 11 but does not significantly cool the gas in the cylinder 11. Thus, when a relatively large water droplet with a relatively large thickness liquid film is formed in the intake port 12A or the cylinder 11, the water droplet does not achieve evaporative cooling of the gas in the cylinder 11. Accordingly, even when the water injection valve 14 injects the target injection amount Qs of water, the formation of a relatively large water droplet as described above cannot cool the inside of the cylinder 11 as intended.

To solve this problem, the present embodiment improves the water injection control to prevent the formation of a relatively large water droplet as described above. Specifically, a different water pressure WP is used for each of the first and injection processes. More specifically, the water pressure WP of the second injection process is higher than the water pressure WP of the first injection process. This means that the injection pressure of the water injection valve 14 is higher in the second injection process than in the first injection process. Such a configuration is employed for the reason described below.

Figure 4:
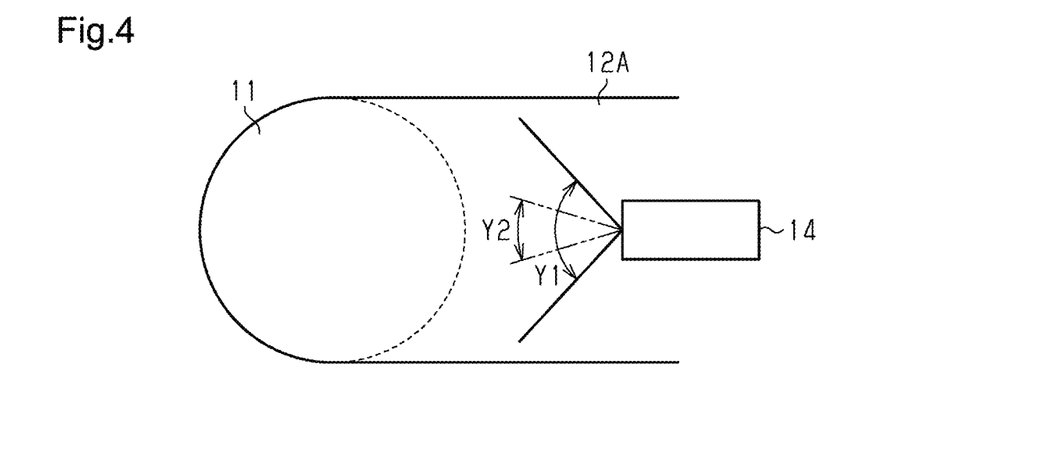
FIG. 4 is a schematic diagram showing the injection range of water from the water injection valve.

When the intake valve 23 is in the valve-closed period U1, the water injection valve 14 may inject water into the intake port 12A. If the injection pressure of the water injection valve 14 is relatively high, the water is dispersed in every direction with momentum from an injection hole of the water injection valve 14. Thus, when the injection pressure of the water injection valve 14 is relatively high, the water injected from the water injection valve 14 is widely dispersed. That is, as illustrated in FIG. 4, the injection range of water with a relatively high injection pressure shown by Y1 is broader than the injection range of water with a relatively low injection pressure shown by Y2. When the same amount of water is injected, the amount of water collecting at each position on the wall surface of the intake port 12A becomes smaller as the injection range of water becomes broader. Thus, the thickness of the liquid film formed by the collected water is relatively small at each position on the wall surface of the intake port 12A. The smaller the thickness of the liquid film, the more quickly the liquid film evaporates. Thus, increasing the injection pressure of the water injection valve 14 prevents the formation of a relatively water droplet on the wall surface of the intake port 12A. In this point of view, the controller 100 sets the water pressure WP to be higher and consequently sets the injection pressure of the water injection valve 14 to be higher in the second injection process. In a situation in which the intake valve 23 is in the valve-closed period U1, the injection pressure that allows water to be dispersed so widely as to prevent the formation of a relatively large water droplet is hereinafter referred to as a second injection pressure J2. The second value WP2, which is the water pressure WP for the second injection process, is the water pressure WP used when the injection pressure of the water injection valve 14 is the second injection pressure J2. The second value WP2 and the second injection pressure J2, on which the second value WP2 is based, are values that have been defined in advance through, for example, experiments or simulations. The defining of the second injection pressure J2 takes into account, for example, the pressure of intake air corresponding to the engine running state when the target injection amount Qs is greater than 0. The difference between the pressure of the intake air and the pressure of the injection from the water injection valve 14 may affect the injection range.

Figure 5:
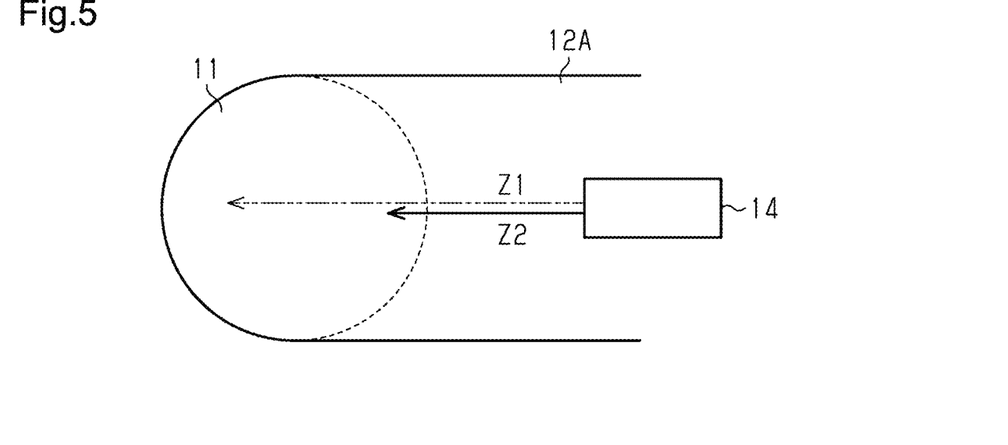
FIG. 5 is a schematic diagram showing the movement distance of water from the water injection valve.

As described above, increasing the injection pressure of the water injection valve 14 is effective for preventing the formation of a relatively water droplet on the wall surface of the intake port 12A, but is not effective for preventing the formation of a relatively large water droplet on the wall surface of the cylinder 11 for the following reason. When the intake valve 23 is in the valve-open period U2, the water injection valve 14 may inject water with a relatively high injection pressure. In this case, as the injection range of water becomes wider, the water may reach a farther position. Additionally, the flow of intake air toward the cylinder 11 occurs in the valve-open period U2 of the intake valve 23. The flow of this intake air causes the water injected by the water injection valve 14 to flow toward the cylinder 11. If the flow of intake air toward the cylinder 11 occurs and the water injection valve 14 injects water to a farther position, the water injected by the water injection valve 14 flows into the cylinder 11 with momentum. Further, as shown by Z1 in FIG. 5, the water is moved a longer distance. The water may reach the wall surface of the cylinder 11. If the water locally collects on the wall surface of the cylinder 11 in a concentrated manner, the collected water forms a relatively large water droplet. That is, increasing the injection pressure of the water injection valve 14 in the valve-open period U2 of the intake valve 23 may rather form a relatively large water droplet. In this regard, decreasing the injection pressure of the water from the water injection valve 14 shortens the movement distance of the water injected from the water injection valve 14. This prevents situations in which the water reaches the wall surface of the cylinder 11. In this point of view, the controller 100 sets the water pressure WP to be lower and consequently sets the injection pressure of the water injection valve 14 to be lower in the second injection process. In a situation in which the intake valve 23 is in the valve-open period U2, the injection pressure that prevents the water injected by the water injection valve 14 from reaching the wall surface of the cylinder 11 is hereinafter referred to as a first injection pressure J1. The first value WP1, which is the water pressure WP for the first injection process, is the water pressure WP used when the injection pressure of the water injection valve 14 is the first injection pressure J1. The first value WP1 and the first injection pressure J1, on which the first value WP1 is based, are values predetermined through, for example, experiments or simulations. The defining of the first injection pressure J1 takes into account, for example, the amount GA of intake air corresponding to the engine running state when the target injection amount Qs is greater than 0. The amount GA of the intake air may affect the movement distance of the water injected from the water injection valve 14.

Advantages of Embodiment (1) When the allowable injection amount Qv is less than the target injection amount Qs, the controller 100 executes the first injection process during the valve-open period U2 of the intake valve 23 and the second injection process during the valve-closed period U1 of the intake valve 23. In these processes, the controller 100 causes the water injection valve 14 to inject the target injection amount Qs of water in the single combustion cycle. To execute the injection processes in the valve-open period U2 and the valve-closed period U1 of the intake valve 23 in this manner, the controller 100 sets the water pressure WP suitable for preventing the formation of a relatively large water droplet in each injection process. This causes most of the target injection amount Qs of water injected from the water injection valve 14 to flow into the cylinder 11 in microaprtice state without becoming a relatively large water droplet. Accordingly, the present embodiment allows substantially all the target injection amount Qs of the water to evaporate in the cylinder 11.

(2) The controller 100 sets the second end time V2B, which is the end time of the second injection process, and the first start time V1A, which is the start time of the first injection process, to be before the first start time V1A by the specified period K. This provides a period during which the open degree D of the adjustment valve 76 is changed from the second open degree D2 to the first open degree D1 by the time the second injection process ends and then the first injection process starts. That is, a period for changing the water pressure WP is provided. By changing the water pressure WP between the two injection processes in this manner, the following effect is obtained. In the second injection process, the water pressure WP is kept at the second value WP2 until the second end time V2B, which is the end time of the second injection process. That is, the second injection pressure J2 is kept until the end time of the second injection process. In the first injection process, the water pressure WP can be set to the first value WP1 from the first start time V1A, which is the start time of the first injection process. That is, the first injection pressure J1 can be used from the start time of the first injection process. Thus, the controller 100 can use a different injection pressure for each of the entire period for executing the second injection process and the entire period for executing the first injection process. This ensures that advantage (1), which allows substantially all the target injection amount Qs of the water to evaporate in the cylinder 11, is achieved.

(3) To minimize the amount of water that collects on the wall surface of the intake port 12A and consequently the formation of a relatively large water droplet, the following procees needs to be executed. When the water injection valve 14 injects water in the valve-closed period U1 of the intake valve 23 through the second injection process, the period during which the injected water remains in the intake port 12A needs to be minimized. To achieve this, the second injection process needs to be executed at a time that is as close as possible to the valve-opening time TS of the intake valve 23.

In the present embodiment, the specified period K from the second end time V2B to the first start time V1A is set as the necessary period, which is a minimum period needed for changing the water pressure WP. Thus, when the water pressure WP is changed between the period from the second end time V2B to the first start time V1A, the period from the second end time V2B to the first start time V1A is minimized. Accordingly, in addition to the configuration of advantage (2), in which a different injection pressure is used for each of the entire period for executing the second injection process and the entire period for executing the first injection process, the second injection process can be executed at a time as close as possible to the valve-opening time TS of the intake valve 23. This is effective in preventing a relatively large water droplet from being formed on the wall surface of the intake port 12A.

Modifications

The above embodiment may be modified as follows. The above embodiment and the following modifications can be combined as long as the combined modifications remain technically consistent with each other.

The water pressure WP may be changed during the execution of the first and second injection processes. For example, when these injection processes are being executed, the running state of the internal combustion engine 10 may change. Further, during the execution periods of the injection processes, the injection pressure of the water injection valve 14 suitable for preventing the formation of a relatively large water droplet may change depending on the change in the running state. With these problems taken into account, the water pressure WP may be changed depending on the running state of the internal combustion engine 10. For example, if a map representing the relationship between the running state of the internal combustion engine 10 and an optimal water pressure WP is created in advance, the water pressure WP can be changed during the execution of the injection processes.

The specified period K is not limited to the example in the above embodiment. Instead, the specified period K does not have to be the necessary period. For example, the specified period K may be longer than the necessary period. In this case, the water pressure WP can be changed from the second value WP2 to the first value WP1 before the first start time V1A. Thus, the second injection process allows the water pressure WP to be kept at the second value WP2 until the end time of the second injection process. Further, the first injection process allows the water pressure WP to be kept at the first value WP1 until the start time of the first injection process. When the specified period K is longer than the necessary period, the water pressure WP may be changed at any point in time of the specified period K. For example, the open degree D of the adjustment valve 76 may be changed subsequent to a predetermined period from the second end time V2B. Further, the timing of changing the open degree D of the adjustment valve 76 may be calculated based on the running state of the internal combustion engine 10.

The specified period K does not have to be used. Further, the second injection process and the first injection process may be executed continuously. In this case, for example, the water pressure WP may start to be lowered during the second injection process so that the water pressure WP has a value suitable for the first injection process at the start time of the first injection process. The water pressure WP in at least part of the period during the execution of the second injection process only needs to be higher than the water pressure WP in at least part of the period during the execution of the first injection process. This configuration prevents the formation of a relatively large water droplet during part of at least the period.

The first start time V1A is not limited to the example in the above embodiment. Instead, the first start time V1A may be subsequent to the valve-opening time TS of the intake valve 23. For example, when the target injection amount Qs is sufficiently smaller than the allowable injection amount Qv, the first start time V1A may be subsequent to the valve-opening time TS of the intake valve 23. This allows the water injection valve 14 to fully supply the target injection amount Qs of water during the valve-open period U2 of the intake valve 23.

The configuration of the water supply mechanism 70 is not limited to the example in the above embodiment. The water supply mechanism 70 only needs to be configured to correctly adjust the water pressure WP for the water injection valve 14. For example, instead of arranging each return passage 79 on a corresponding branch passage 75 as in the above embodiment, the water supply mechanism 70 may include only one return passage. In addition, the water supply mechanism 70 may include only one adjustment valve 76. In this case, in the same manner as the above embodiment, the pump 77 is located in the supply passage 74 that extends from the tank 78, and each branch passage 75 branches from the supply passage 74. Further, the return passage connects the tank 78 to the portion of the supply passage 74 downstream of the pump 77 and upstream of the portions branched into the branch passages 75. Furthermore, the adjustment valve 76 is located in the return passage. In this case, the pressure of water flowing downstream of the pump 77 in the supply passage 74 changes depending on the open degree D of the adjustment valve 76. This changes the water pressures WP for all the water injection valves 14. In such a manner, a common adjustment valve may be disposed on all the water injection valves 14, and this adjustment valve may be used to collectively change the water pressures WP for all the water injection valves 14. This configuration may be employed if it is already clear that the period for executing the first injection process for a specific cylinder 11 does not overlap the period for executing the second injection process for another cylinder 11 because of, for example, the setting of the target injection amount Qs in the target water amount map M1.

The pump 77 does not have to be driven by an electric motor. The pump 77 may be driven by, for example, the crankshaft 18. In this case, the open degree D of the adjustment valve 76 only needs to be adjusted in correspondence with a driven state of the pump 77 to obtain a correct water pressure WP.

Each adjustment valve 76 does not need to have the configuration of the above embodiment. The adjustment valve 76 only needs to change the water pressure WP. The adjustment valve 76 may be, for example, a ball valve.

The pressure adjustment device is not limited to the example in the above embodiment. For example, the pressure adjustment device may change the water pressure WP by changing the discharge amount of the pump 77 and the open degree D of each adjustment valve 76. In this case, the pressure adjustment device includes the pump 77 and the adjustment valves 76. Instead, the pressure adjustment device may change the water pressure WP by changing only the discharge amount of the pump 77. In this case, the pressure adjustment device includes the pump 77. The pressure adjustment device is not limited to a pump or a valve. The pressure adjustment device only needs to correctly change the water pressure WP. Based on the configuration of the pressure adjustment device that is to be controlled, the controller 100 needs to control the pressure adjustment device. Depending on the configuration of the pressure adjustment device, the controller 100 may refer to the detection value of the water pressure sensor 30 and perform feedback control on the pressure adjustment device such that a correct water pressure WP is obtained.

The reach period L is not limited to a fixed value and may be changed depending on, for example, the amount GA of intake air. The reach period L may be 0. In this case, most of the target injection amount Qs of water reaches the inside of each cylinder 11.

The content of the target water amount map M1 is not limited to the example in the above embodiment. The target water amount map M1 only needs to be set depending on the engine running state to inject water needed to cool the inside of the cylinder 11 by a necessary amount.

The method for obtaining the crank position Scr at which the intake valve 23 reaches the valve-opening time TS is not limited to the example in the above embodiment. For example, detection values of the crank position sensor 34 and the intake cam position sensor 36 may be used to obtain the crank position Scr at which the intake valve 23 reaches the valve-opening time TS. If the crank position Scr at which the intake valve 23 reaches the valve-opening time TS can be correctly obtained, any method may be employed. The same applies to the crank position Scr at which the intake valve 23 reaches the valve-closing time TC.

The overall configuration of the internal combustion engine 10 is not limited to the example of the above embodiment. For example, the number of the cylinders 11 may be changed. The internal combustion engine 10 only needs to include the water injection valves 14, the intake valve 23, and the pressure adjustment device.

Figure 6:
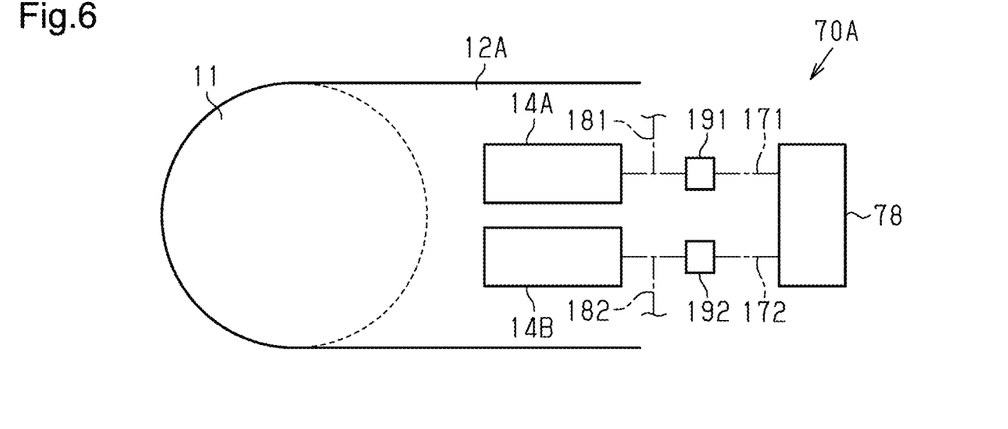
FIG. 6 is a schematic diagram showing the structure of the water injection valve according to a modification.

The number of the water injection valves 14 in each cylinder 11 is not limited to the example of the above embodiment. For example, as shown in FIG. 6, one cylinder 11 may include two water injection valves 14. The two water injection valves 14 may inject water into the cylinder 11 through the intake port 12A. The two water injection valves 14 are hereinafter referred to as a first water injection valve 14A and a second water injection valve 14B. When one cylinder 11 includes the first water injection valve 14A and the second water injection valve 14B, the following configuration may be employed. A water supply mechanism 70A is used such that each of the first water injection valve 14A and the second water injection valve 14B is supplied with water with a different water pressure WP. Specifically, the first water injection valve 14A is connected to a first passage 171 that extends from the tank 78, and the second water injection valve 14B is connected to a second passage 172 that extends from the tank 78. For example, a first pump is disposed in the first passage 171 as a first pressure adjustment device 191, and a second pump is disposed in the second passage 172 as a second pressure adjustment device 192. The controller 100 controls driving of the first pump such that the water pressure WP of the water supplied to the first water injection valve 14A has the first value WP1. Further, the controller 100 controls driving of the second pump such that the water pressure WP of the water supplied to the second water injection valve 14B has the second value WP2, which is greater than the first value WP1. The controller 100 uses the first water injection valve 14A as a water injection valve 14 dedicated for the first injection process and uses the second water injection valve 14B as a water injection valve 14 dedicated for the second injection process. Unlike the configuration of the above embodiment, in which the first and second injection processes are executed using a common water injection valve 14, the configuration of this modification eliminates the need for the pressure adjustment device to change the water pressure WP depending on the execution of each injection process. Thus, even if the specified period K for changing the water pressure WP is not provided, a different injection pressure can be used for each of the entire period during which the second injection process is executed and the entire period during which the first injection process is executed. That is, this configuration allows the second injection process and the first injection process to be executed continuously while also using a different injection pressure in the entire period of each of the two injection processes. While FIG. 6 shows only one of the cylinders 11, the first water injection valve 14A and the second water injection valve 14B are disposed on another cylinder 11 in the same manner. The first water injection valve 14A corresponding to a further cylinder 11 is connected to a first branch passage 181 branched ing pefrom a portion of the first passage 171 downstream of the first pressure adjustment device 191. The second water injection valve 14B corresponding to yet another cylinder 11 is connected to a second branch passage 182 branched from a portion of the second passage 172 downstream of the second pressure adjustment device 192. In a case in which each cylinder 11 includes multiple water injection valves 14, the configuration of the water supply mechanism is not limited to the example of FIG. 6. The water supply mechanism only needs to supply each water injection valve 14 with the water having a correct water pressure WP.

The overall configuration of the vehicle 300 is not limited to the example of the above embodiment. For example, the vehicle 300 may include a motor generator as the driving source of the vehicle 300, in addition to the internal combustion engine 10.

The amount of water injected from the water injection valves 14 in the first injection process and the amount of water injected from the water injection valves 14 in the second injection process are not limited to the examples of the above embodiment. For example, when the allowable injection amount Qv is less than the target injection amount Qs, the amount of water injected from the water injection valves 14 in the first injection process may be less than the allowable injection amount Qv. In this case, the set injection amount Qr by which water is injected from the water injection valves 14 in the second injection process may be increased accordingly.

In the comparison between the second injection process in a specific combustion cycle and the first injection process in a different combustion cycle, the use of a different water pressure WP in each of the injection processes is effective for preventing the formation of a relatively large water droplet. In this regard, for example, the following configuration may be employed. In the specific combustion cycle, only the second one of the first and second injection processes is executed. Then, the water pressure WP in the second injection process is set to be higher than the water pressure WP in the first injection process of the different combustion cycle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the internal combustion engine including:
   a cylinder;
   an intake passage connected to the cylinder;

a water injection valve configured to inject water into the intake passage;

an intake valve configured to selectively open and close a connection port between the intake passage and the cylinder; and a pressure adjustment device configured to adjust pressure of water supplied to the water injection valve, wherein the controller comprises processing circuitry configured to execute a first injection process that causes the water injection valve to inject water when the intake valve is open and a second injection process that causes the water injection valve to inject water when the intake valve is closed, and the processing circuitry is configured to control the pressure adjustment device such that the pressure of the water supplied to the water injection valve becomes higher in the second injection process than in the first injection process.

2. The controller according to claim 1, wherein the processing circuitry is configured to set a start time of the second injection process such that the second injection process ends before a start time of the first injection process by a specified period.

3. The controller according to claim 2, wherein the processing circuitry is configured to:

control the pressure adjustment device such that the pressure of the water supplied to the water injection valve has a predetermined first value during the execution of the first injection process;

control the pressure adjustment device such that the pressure of the water supplied to the water injection valve has a predetermined second value during the execution of the second injection process; and set the specified period to a minimum period for the pressure adjustment device to change the pressure of the water from the second value to the first value.

4. A control method for an internal combustion engine, the internal combustion engine including:

a cylinder;

an intake passage connected to the cylinder;

a water injection valve configured to inject water into the intake passage; and an intake valve configured to selectively open and close a connection port between the intake passage and the cylinder, wherein the control method comprises:

executing a first injection process that causes the water injection valve to inject water when the intake valve is open;

executing a second injection process that causes the water injection valve to inject water when the intake valve is closed; and setting pressure of the water supplied to the water injection valve to be higher in the second injection process than in the first injection process.

* * * * *